(12) United States Patent
Kim

(10) Patent No.: US 10,860,125 B2
(45) Date of Patent: Dec. 8, 2020

(54) DRIVING CIRCUIT, DISPLAY PANEL, DISPLAY DEVICE, AND DRIVING METHOD

(71) Applicant: LG Display Co., Ltd., Seoul (KR)

(72) Inventor: HongChul Kim, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/188,797

(22) Filed: Nov. 13, 2018

(65) Prior Publication Data

US 2019/0155429 A1 May 23, 2019

(30) Foreign Application Priority Data

Nov. 17, 2017 (KR) .......................... 10-2017-0154207

(51) Int. Cl.
| | |
|---|---|
| *G06F 3/041* | (2006.01) |
| *G06K 9/00* | (2006.01) |
| *G09G 3/22* | (2006.01) |
| *G06F 3/042* | (2006.01) |
| *G09G 3/20* | (2006.01) |

(52) U.S. Cl.
CPC ............ *G06F 3/0412* (2013.01); *G06F 3/042* (2013.01); *G06F 3/0421* (2013.01); *G06K 9/0004* (2013.01); *G09G 3/20* (2013.01); *G09G 3/22* (2013.01); *G06F 2203/04109* (2013.01); *G09G 2310/0264* (2013.01); *G09G 2354/00* (2013.01); *G09G 2360/14* (2013.01)

(58) Field of Classification Search
CPC ...... G06F 3/0412; G06F 3/0421; G06F 3/042; G06F 2203/04109; G09G 3/20; G09G 3/22; G09G 2360/14; G09G 2354/00; G09G 2310/0264; G06K 9/0004
See application file for complete search history.

(56) References Cited

U.S. PATENT DOCUMENTS

| | | | |
|---|---|---|---|
| 2002/0054394 A1* | 5/2002 | Sasaki | G06K 9/00899 358/514 |
| 2010/0039406 A1* | 2/2010 | Lee | G02F 1/13338 345/174 |
| 2011/0018834 A1* | 1/2011 | Yuan | G02F 1/00 345/173 |
| 2017/0038866 A1* | 2/2017 | Akhavan Fomani | G06F 3/044 |
| 2018/0060642 A1* | 3/2018 | Kim | G06K 9/0004 |

* cited by examiner

*Primary Examiner* — Carolyn R Edwards
(74) *Attorney, Agent, or Firm* — Seed IP Law Group LLP

(57) ABSTRACT

Disclosed are a display panel and a display device which can sense a fingerprint. A photo-sensor is disposed within a sub-pixel, a voltage change of a pixel electrode according to a leakage current of the photo-sensor exposed to light is sensed, and a fingerprint is sensed, so that a fingerprint can be sensed in an active area of a display panel. Also, a voltage change of the pixel electrode is sensed using a common electrode without directly applying a driving voltage to the pixel electrode, so as to perform driving of the pixel electrode and light irradiation together, thereby enabling a reduction in a fingerprint sensing mode and detection of only the level of a leakage voltage during fingerprint sensing. Therefore, a sensing circuit can be efficiently configured, and sensing sensitivity can be improved.

19 Claims, 14 Drawing Sheets

FIG.13
Light blocking area : Vref              Light exposure area : Vref − Vleak
Vout(Vref−Vref)      Vout(Vref−(Vref−Vleak)) 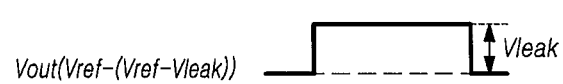

DRIVING CIRCUIT, DISPLAY PANEL, DISPLAY DEVICE, AND DRIVING METHOD

CROSS REFERENCE TO RELATED APPLICATION

This application claims priority from Korean Patent Application No. 10-2017-0154207, filed Nov. 17, 2017, which is hereby incorporated by reference for all purposes as if fully set forth herein.

BACKGROUND

Technical Field

The present disclosure relates to a driving circuit, a display panel, and a display device.

Description of the Related Art

With the advancement of the information-oriented society, various requirements for display devices that display images have been increasing, and use has been made of various types of display devices, such as Liquid Crystal Display (LCD) devices, plasma display devices, and Organic Light-Emitting Display (OLED) devices.

In order to provide more various functions to users, such display devices provide a function of recognizing a user's touch on a display panel and processing an input on the basis of the recognized touch.

As an example, a display panel has a plurality of touch electrodes arranged therein, and a touch driving signal is applied to the plurality of touch electrodes during a touch sensing mode. Then, whether there is a user touch and the position of the touch can be detected by sensing a variation of a capacitance generated when the user touches the display panel.

Also, in order to provide an input processing function using the user's biometric information, a display device, which has a function of sensing the fingerprint of the user's finger that touches the display panel, identifying the user, and processing an input, is provided.

Such a display device capable of recognizing a fingerprint includes a display panel having a bezel area (a non-active area) in which an image is not displayed and a fingerprint sensor is disposed. Therefore, the display device can sense the user's fingerprint. This configuration is disadvantageous in that the disposition of the fingerprint sensor forces the bezel area to be larger and an image display area (an active area) to be smaller.

Accordingly, there is a need for a method capable of sensing the user's fingerprint in the active area of the display panel.

However, for fingerprint sensing, it is necessary to resolve a fingerprint into ridges and valleys, and thus there is a need for high resolution and high sensing sensitivity. Therefore, it is very difficult to provide a fingerprint sensing function in the active area of the display panel.

BRIEF SUMMARY

With this background, an aspect of the present disclosure is to provide a display panel and a display device capable of sensing a fingerprint in an active area of a display panel, and a fingerprint sensing circuit for sensing a fingerprint.

Another aspect of the present disclosure is to provide a fingerprint sensing circuit, a display panel, and a display device capable of minimizing an influence on a display driving mode and touch sensing mode that fingerprint sensing in an active area of a display panel exerts.

Still another aspect of the present disclosure is to efficiently configure a fingerprint sensing circuit for sensing a fingerprint in an active area of a display panel, and provide a fingerprint sensing circuit, a display panel, and a display device capable of improving the sensitivity of fingerprint sensing.

In accordance with an aspect of the present disclosure, there is provided a display panel including: a plurality of gate lines; a plurality of data lines; a plurality of sub-pixels which are areas adjacent to the intersections between the gate lines and the data lines; a first electrode disposed within each of the plurality of sub-pixels; a second electrode configured to form a capacitor with the first electrode; a transistor having a first node disposed within each of the plurality of sub-pixels and electrically connected to each of the data lines, a second node electrically connected to each of the gate lines, and a third node electrically connected to the first electrode; a photo-sensor electrically connected between the first node and the third node of the transistor; a light source configured to emit light; and a driving circuit configured to output a driving voltage to the first electrode or the second electrode, and sense a voltage of the first electrode through each of the data lines.

In accordance with another aspect of the present disclosure, there is provided a display panel including: a plurality of gate lines; a plurality of data lines; a plurality of sub-pixels which are areas adjacent to the intersections between the gate lines and the data lines; a first electrode disposed within each of the plurality of sub-pixels; a second electrode configured to form a capacitor with the first electrode; a transistor having a first node disposed within each of the plurality of sub-pixels and electrically connected to each of the data lines, a second node electrically connected to each of the gate lines, and a third node electrically connected to the first electrode, wherein the transistor is turned off for the first period in the fingerprint sensing mode and is turned on for the second period after the first period; a photo-sensor electrically connected between the first node and the third node of the transistor; a light source configured to emit light for the first period in the fingerprint sensing mode; and a driving circuit configured to: for a first period in a fingerprint sensing mode, output the driving voltage to the second electrode, and output a reference voltage to each of the data lines; and for a second period in the fingerprint sensing mode, sense the voltage of the first electrode through each of the data lines.

In accordance with still another aspect of the present disclosure, there is provided a display device including: a display panel having a plurality of gate lines and a plurality of data lines arranged therein, and including a plurality of sub-pixels which are areas adjacent to the intersections between the gate lines and the data lines; a first electrode disposed within each of the plurality of sub-pixels; a second electrode configured to form a capacitor with the first electrode; a transistor disposed within each of the plurality of sub-pixels, and electrically connected between each of the data lines and the first electrode; a photo-sensor connected between a source node and a drain node of the transistor; a light source configured to emit light; and a driving circuit configured to: output the driving voltage to the first electrode or the second electrode, sense the voltage of the first electrode through each of the data lines.

In accordance with still another aspect of the present disclosure, there is provided a driving circuit including: a driving voltage output unit configured to, for a first period in a fingerprint sensing mode, output a driving voltage to a common electrode configured to form a capacitor with a pixel electrode disposed within each of sub-pixels; a reference voltage output unit configured to, for the first period in the fingerprint sensing mode, output a reference voltage to each of data lines connected to the pixel electrode through a transistor; and a sensing circuit configured to, for a second period in the fingerprint sensing mode, sense a voltage of the pixel electrode.

The driving circuit may be driven using a driving method including: outputting a driving voltage to a common electrode disposed in a fingerprint sensing area for a first period in a fingerprint sensing mode; outputting a reference voltage to a data line connected to a pixel electrode, disposed in the fingerprint sensing area, through a transistor for the first period in the fingerprint sensing mode; and sensing a voltage of the pixel electrode for a second period after the first period in the fingerprint sensing mode.

According to embodiments of the present disclosure, a photo-sensor is disposed within a sub-pixel, and the voltage difference between pixel electrodes, which is caused by a leakage current generated when the photo-sensor is exposed to light during a fingerprint sensing mode, is sensed, so that a fingerprint can be sensed in the active area of the display panel.

According to embodiments of the present disclosure, a leakage current is generated by applying a driving voltage for fingerprint sensing to a pixel electrode and irradiating, with light, a photo-sensor, so that a fingerprint can be sensed in the active area of the display panel by sensing the voltage difference between pixel electrodes.

According to embodiments of the present disclosure, in the process of sensing the voltage difference between pixel electrodes for fingerprint sensing, a voltage change between the pixel electrodes is sensed by applying a pulse voltage to only a common electrode without directly applying a driving voltage to a pixel electrode, so that a fingerprint sensing mode can be shortened, sensing sensitivity can be improved, and a fingerprint sensing circuit can be efficiently configured.

BRIEF DESCRIPTION OF THE SEVERAL VIEWS OF THE DRAWINGS

The above and other aspects, features, and advantages of the present disclosure will be more apparent from the following detailed description taken in conjunction with the accompanying drawings, in which:

FIG. 13 is a view illustrating an example of a signal detected during a fingerprint sensing mode when a fingerprint is sensed according to the second embodiment.

DETAILED DESCRIPTION OF THE EXEMPLARY EMBODIMENTS

Figure 1:
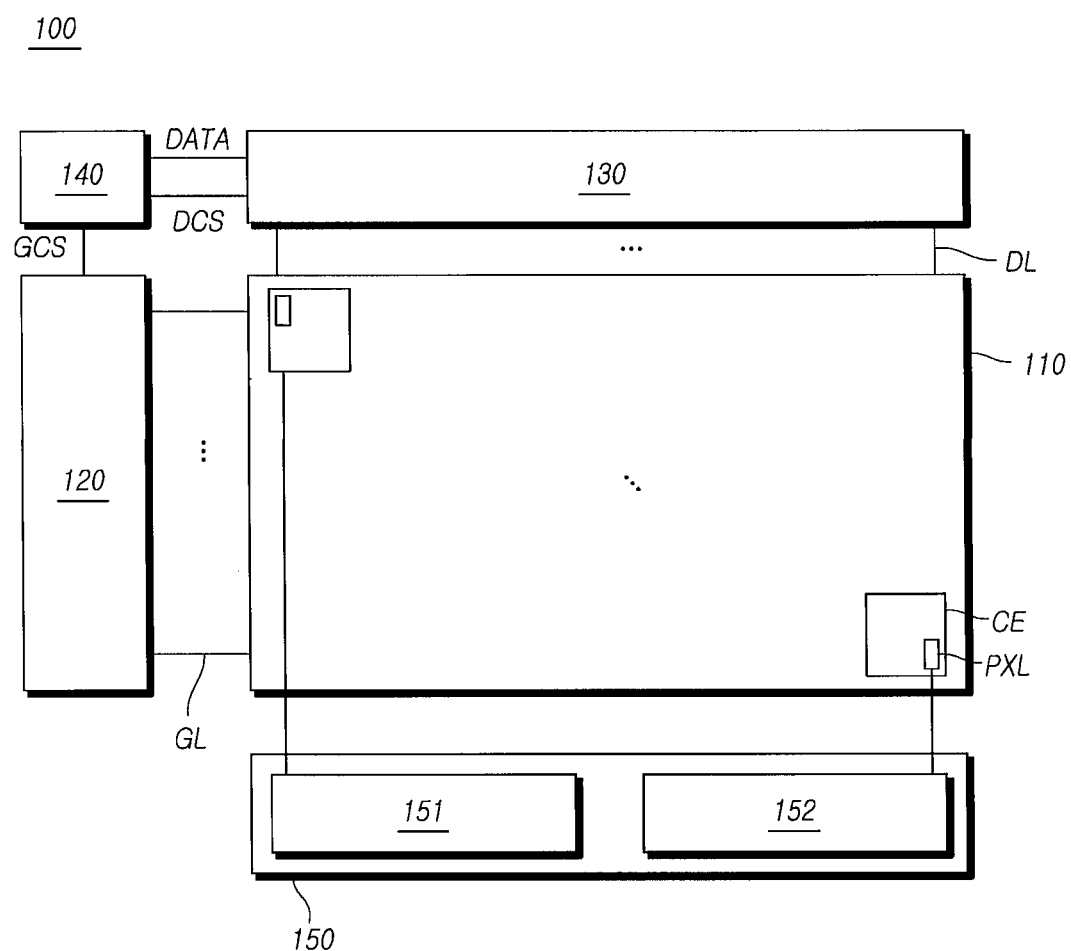
FIG. 1 is a block diagram illustrating a schematic configuration of a display device capable of sensing a fingerprint according to embodiments of the present disclosure.

Hereinafter, exemplary embodiments of the present disclosure will be described in detail with reference to the accompanying drawings. In assigning reference numerals to elements in the drawings, the same reference numerals will designate the same elements where possible although they are shown in different drawings. Also, in the following description of the present disclosure, a detailed description of known functions and configurations incorporated herein will be omitted when it may make the subject matter of the present disclosure rather unclear.

In addition, such terms as "first," "second," "A," "B," "(a)," "(b)," and the like, may be used herein when describing elements of the present disclosure. These terms are merely used to distinguish one element from other elements, and the essence of a corresponding element, an order thereof, a sequence thereof, or the number of the corresponding elements are not limited by the terms. When an element is described as being "connected," "coupled," or "linked" to another element, it will be understood that the element may not only be directly connected or coupled to said another element, but may also be "connected," "coupled," or "linked" to said another element through a third element, or the third element may also be interposed between the element and said another element.

FIG. 1 is a block diagram illustrating a schematic configuration of a display device 100 capable of sensing a fingerprint according to embodiments of the present disclosure.

Referring to FIG. 1, the display device 100 according to embodiments of the present disclosure may include: a display panel 110 in which a plurality of gate lines GL, a plurality of data lines DL, and a plurality of sub-pixels SP are arranged wherein the a plurality of sub-pixels SP are areas adjacent to the intersections between the gate lines and the data lines; a gate driving circuit 120 configured to drive the plurality of gate lines GL; a data driving circuit 130 configured to drive the plurality of data lines DL; and a controller 140 configured to control the gate driving circuit 120 and the data driving circuit 130. The terms "intersect" and "intersection" are used herein in their broadest sense to include within the meaning that one element crosses over or overlaps another element, and does not necessarily require that the two elements contact each other. For example, the data lines DL and the gate lines GL stated as intersecting herein may overlap, and thus intersect with each other within the broadest sense of the term, but may be physically separated from one another, for example, by one or more insulating layers or elements provided there between. It also includes within its meaning, in some embodiments, that the lines can merge or contact each other at the location where they cross.

Also, the display device 100 may include a sensing circuit 150 configured to detect a signal generated during a touch of a finger or a touch of a user's fingerprint by using a pixel electrode PXL disposed within each of the sub-pixels SP, or a common electrode CE disposed within at least two sub-pixels SP.

The display panel 110 includes an active area A/A, in which a plurality of sub-pixels SP displaying an image are arranged, and a non-active area N/A located in an external area of the active area A/A.

A pixel electrode PXL to which a data voltage is applied during display driving may be disposed within each sub-pixel SP. Also, a common electrode CE to which a common voltage Vcom is applied during display driving may be disposed in an area where at least two sub-pixels SP are arranged and thus provide the common voltage to two sub-pixels at the same time. Generally, a pixel will be composed of two, three or more sub-pixels and each sub-pixel emits a single color of light. A pixel might emit light from just one sub-pixel at a selected time or it might emit light that is a combination of some or all of the sub-pixels within it at a selected time, depending on the image to be displayed. In some contexts, the term pixel might be used when applied to a sub-pixel, with the term pixel having the meaning of a single LED that is emitting light.

The gate driving circuit 120 outputs a scan signal to the plurality of gate lines GL so as to control driving timing of the plurality of sub-pixels SP arranged in the display panel 110.

Under the control of the controller 140, the gate driving circuit 120 sequentially drives the plurality of gate lines GL by sequentially supplying a scan signal of an on-voltage or an off-voltage to the plurality of gate lines GL.

According to a driving scheme, the gate driving circuit 120 may be disposed on one side of the display panel 110, or may be arranged on both sides thereof. Alternatively, the gate driving circuit 120 may be disposed at a rear surface of the display panel 110.

Also, the gate driving circuit 120 may include one or more gate driver integrated circuits.

Each of the gate driver integrated circuits may be connected to a bonding pad of the display panel 110 by using a Tape-Automated-Bonding (TAB) scheme or a Chip-On-Glass (COG) scheme, or may be implemented in a Gate-In-Panel (GIP) type so as to be directly disposed in the display panel 110.

Alternatively, the gate driver integrated circuits may be integrated into the display panel 110 so as to be arranged therein, or may be implemented using a Chip-On-Film (COF) scheme in which the gate driver integrated circuits are mounted on a film connected to the display panel 110.

The data driving circuit 130 outputs data voltages to the data lines DL in line with timing at which a scan signal is applied to the gate lines GL, and causes the sub-pixels SP to express respective brightnesses according to image data.

When particular gate lines GL are open, the data driving circuit 130 drives the plurality of data lines DL by converting image data DATA received from the controller 140 into data voltages having an analog form and supplying the same to the plurality of data lines DL.

The data driving circuit 130 may include one or more source driver integrated circuits so as to drive the plurality of data lines DL.

Each of the source driver integrated circuits may be connected to a bonding pad of the display panel 110 by using a TAB scheme or a COG scheme, may be directly disposed in the display panel 110, or may be integrated into the display panel 110 so as to be disposed therein.

Alternatively, each of the source driver integrated circuits may be implemented using a COF scheme. In the present example, one terminal of each source driver integrated circuit may be bonded to at least one source printed circuit board, and the other terminal thereof may be bonded to the display panel 110.

The controller 140 supplies various control signals to the gate driving circuit 120 and the data driving circuit 130 so as to control operations of the gate driving circuit 120 and the data driving circuit 130.

The controller 140: starts a scan according to timing implemented in each frame; changes input image data (or external data), received from the outside, so as to meet a data signal format used in the data driving circuit 130, and outputs the changed image data; and controls data driving at appropriate timing in line with the scan.

The controller 140 may receive, from the outside (e.g., a host system), various timing signals, including a vertical synchronization signal Vsync, a horizontal synchronization signal Hsync, an input Data Enable (DE) signal, a clock signal CLK, and the like, as well as the input image data.

In addition to changing the input image data, received from the outside, so as to meet the data signal format used in the data driving circuit 130, and outputting the changed image data, in order to control the gate driving circuit 120 and the data driving circuit 130, the controller 140 may generate various control signals by using the received timing signals, and may output the same to the gate driving circuit 120 and the data driving circuit 130.

As an example, in order to control the gate driving circuit 120, the controller 140 outputs various gate control signals GCS, including a gate start pulse GSP, a gate shift clock GSC, a gate output enable signal GOE, and the like.

In the present example, the gate start pulse GSP controls operation start timing of one or more gate driver integrated circuits constituting the gate driving circuit 120. The gate shift clock GSC is a clock signal commonly input to one or more gate driver integrated circuits, and controls shift timing of a scan signal. The gate output enable signal GOE designates timing information of one or more gate driver integrated circuits.

Also, in order to control the data driving circuit 130, the controller 140 outputs various data control signals DCS, including a source start pulse SSP, a source sampling clock SSC, a source output enable signal SOE, and the like.

In the present example, the source start pulse SSP controls data sampling start timing of one or more source driver integrated circuits constituting the data driving circuit 130. The source sampling clock SSC is a clock signal for controlling sampling timing of data in each source driver integrated circuit. The source output enable signal SOE controls output timing of the data driving circuit 130.

The controller 140 may be disposed on a control printed circuit board that is connected to a source printed circuit board, to which source driver integrated circuits are bonded, through a connection medium such as a Flexible Flat Cable (FFC) or a Flexible Printed Circuit (FPC).

The control printed circuit board may further include a power controller that is disposed thereon and is configured to supply various voltages or currents to the display panel 110, the gate driving circuit 120, the data driving circuit 130, and the like, or is configured to control various voltages or currents to be supplied.

The sensing circuit 150 may be electrically connected to the common electrodes CE, and may include a touch sensing circuit 151 configured to sense a touch to the display panel 110 by using the common electrodes CE.

That is, during display driving, each of the common electrodes CE may receive a common voltage Vcom applied thereto and may be used as an electrode for display driving. During touch sensing, each of the common electrodes CE may receive a touch driving signal applied thereto and may be used as an electrode for touch sensing.

The sensing circuit 150 may be electrically connected to the pixel electrodes PXL through the data lines DL, and may include a fingerprint sensing circuit 152 configured to sense the user's fingerprint by using the pixel electrodes PXL.

In order to detect a fingerprint, it is necessary to resolve the fingerprint into ridges and valleys, and thus there is a need for a high resolution of sensing data. Accordingly, a fingerprint may be sensed using a pixel electrode PXL disposed within each sub-pixel SP.

The fingerprint sensing circuit 152 may sense a change of a capacitance or voltage of a pixel electrode PXL generated during a touch of the user's fingerprint and may use the sensed change of the capacitance or voltage to detect a fingerprint.

The touch sensing circuit 151 and the fingerprint sensing circuit 152 may be implemented as separate circuits, or may be implemented as one circuit.

Also, the touch sensing circuit 151 and the fingerprint sensing circuit 152 may convert the detected signal into digital data and may transmit the converted digital data to a micro-control unit MCU so that the micro-control unit MCU can detect the touch or fingerprint on the basis of the received sensing data.

Figure 2:
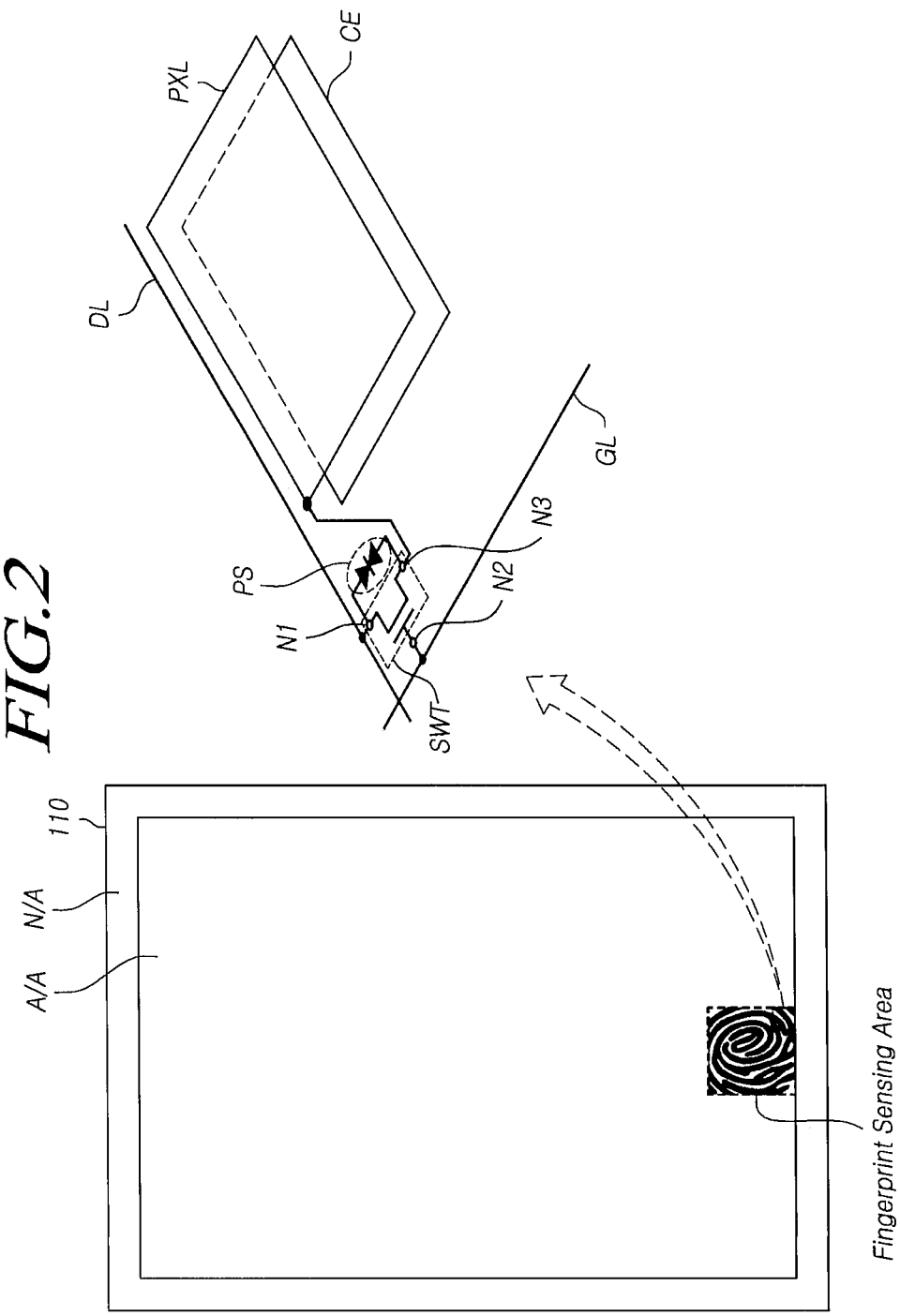
FIG. 2 is a view illustrating an example of a structure of a sub-pixel disposed in a fingerprint sensing area in a display device according to embodiments of the present disclosure.

FIG. 2 is a view illustrating an example of a structure of a sub-pixel SP disposed in a fingerprint sensing area in a display device 100 according to embodiments of the present disclosure.

Referring to FIG. 2, in the display device 100 according to embodiments of the present disclosure, the fingerprint sensing area may be disposed in an active area A/A of the display panel 110. Also, the fingerprint sensing area may sense a fingerprint without being limited to a particular position in the active area A/A.

Within a sub-pixel SP located in the fingerprint sensing area, a gate line GL and a data line DL intersect with each other, and a switching transistor SWT, a pixel electrode PXL, a common electrode CE, and an photo-sensor PS may be disposed.

The switching transistor SWT may have a first node N1 disposed within each of the plurality of sub-pixels and electrically connected to the data line DL, a second node N2 electrically connected to the gate line GL, and a third node N3 electrically connected to the pixel electrode PXL.

During a display driving mode, the switching transistor SWT may be turned on/off according to a scan signal applied to the gate line GL, and when the switching transistor SWT is turned on, a data voltage supplied through the data line DL is applied to the pixel electrode PXL.

The pixel electrode PXL is disposed within each sub-pixel SP, and is electrically connected to the data line DL through the switching transistor SWT. Also, the pixel electrode PXL and the common electrode CE may form a capacitor C therebetween so as to make it possible to maintain a voltage during one frame in a display driving mode.

The common electrode CE may be disposed in an area including at least two sub-pixels SP; during a display driving mode, may receive a common voltage Vcom applied thereto; during a touch sensing mode, may receive a touch driving signal applied thereto; and thus may be used as a touch electrode. The common electrode can thus be used for two different functions at different times, while in a display mode it is one of the electrode plates of a capacitor used to drive the drive transistor for the LED to emit light and while in a touch sensing mode, it may receive a touch driving signal.

The photo-sensor PS may be electrically connected between the first and third nodes N1 and N3 of the switching transistor SWT.

The photo-sensor PS may have such photosensitivity that an electrical characteristic thereof is changed when being exposed to light having a particular wavelength.

As an example, before being exposed to light, the photo-sensor PS operates like a nonconductor. When exposed to light of selected wavelength, an electrical characteristic of the photo-sensor PS is changed, both terminals thereof are electrically connected, and thus, the photo-sensor PS operates like a conductor. In the present example, the photo-sensor PS may also be referred to as an "optical sensor" or the like.

The display device 100 according to embodiments of the present disclosure may detect the user's fingerprint that touches the fingerprint sensing area by using the photo-sensor PS electrically connected between the first node N1 and third node N3 of the switching transistor SWT.

Figure 3:
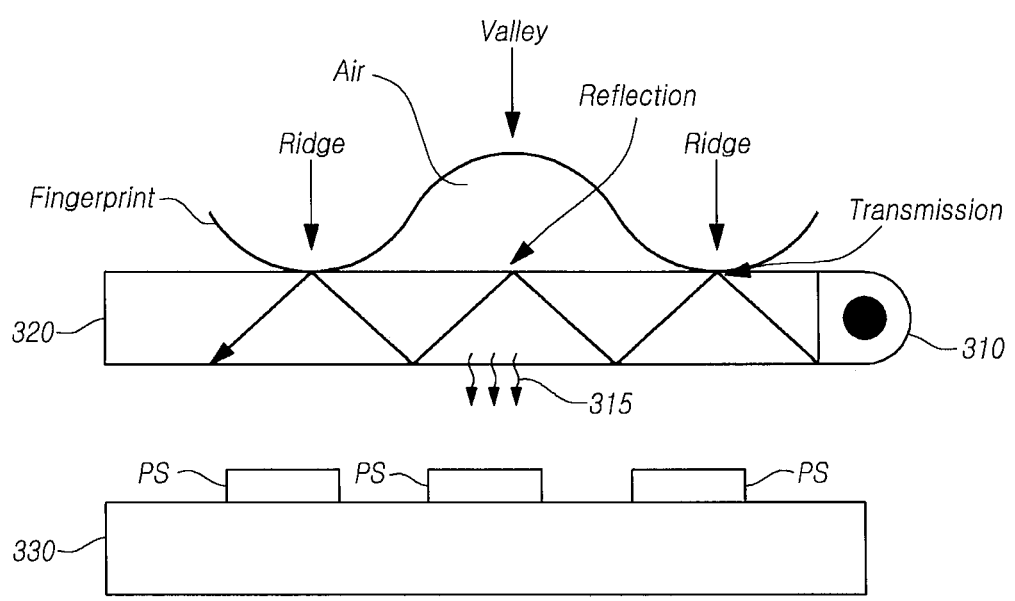
FIG. 3 is a view for explaining a principle of sensing a fingerprint by using a plurality of photo-sensors in a display device according to embodiments of the present disclosure.

FIG. 3 is a view for explaining a principle of sensing a fingerprint by using a plurality of photo-sensors in the display device 100 according to embodiments of the present disclosure.

Referring to FIG. 3, the display device 100 according to embodiments of the present disclosure has a plurality of photo-sensors PS disposed within a sub-pixel SP of a fingerprint sensing area on a substrate 330.

Also, the display device 100 may include a light source 310 configured to emit light during a fingerprint sensing mode, and a light guide plate 320 configured to guide the light emitted by the light source 310. The light guide plate 320 is only an example, and various elements, including a light guide panel, a light guide apparatus, a cover glass of the display panel 110, and the like, may be used in place of the light guide plate 320.

In the present example, when the display device 100 is implemented by an LCD device, the light source 310 configured to emit light may be implemented as a backlight of the LCD device. Alternatively, the light source 310 configured to emit light may be implemented as a light source implemented separately from a backlight of an LCD device.

During a fingerprint sensing mode, when the light source 310 emits light having a particular wavelength, the light emitted by the light source 310 may be propagated along the light guide plate 320.

In the present example, when the user's fingerprint touches the surface of the display panel 110 corresponding to the fingerprint sensing area, transmission or reflection of light may occur according to whether a portion of the user's fingerprint is a ridge which is a convex portion of the fingerprint or a valley which is a concave portion thereof.

As an example, a refractive index of the finger is almost identical to that of glass and thus light, which has reached a part at which the ridge of the fingerprint touches the light guide plate 320, transmits through the part. Then, the light, which has transmitted through the part travels to the outside, and thus, a photo-sensor PS disposed in an area corresponding to the ridge of the fingerprint is not exposed to the light (a light blocking area). As can be seen, examples of a plurality of photo-sensors PS are present in FIG. 3, one of which is adjacent to a valley that will be exposed to light 315 and the other two of which are adjacent to a ridge that will not be exposed to light.

Also, at a part at which the valley of the fingerprint is positioned, the valley of the fingerprint does not touch the light guide plate 320, and thus, air occupies the space between the valley of the fingerprint and the light guide plate 320. A refractive index of air is different from that of glass, and thus, light cannot transmit through the part at which the valley of the fingerprint is positioned, and is thus reflected at the part. Accordingly, a photo-sensor PS disposed in an area corresponding to the valley of the fingerprint is exposed to the light (a light exposure area).

That is, light may be blocked from the photo-sensor PS disposed in the area corresponding to the ridge of the fingerprint, but the photo-sensor PS disposed in the area corresponding to the valley thereof may be exposed to light.

Also, an electrical characteristic of a photo-sensor PS depends on whether the photo-sensor PS is blocked from light or is exposed to light.

The display device 100 according to embodiments of the present disclosure provides a method for resolving a fingerprint into a ridge and a valley and sensing the fingerprint by using the change in the electrical characteristic of the photo-sensor PS depending on whether the photo-sensor PS is blocked from light or is exposed to light.

Figure 4:
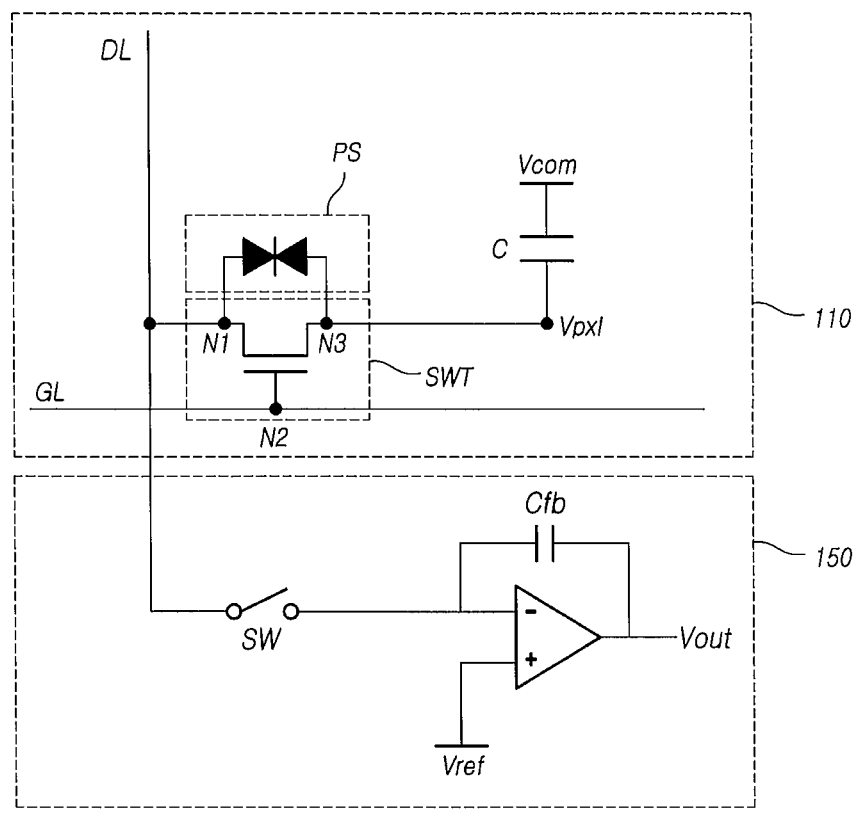
FIG. 4 is a circuit diagram illustrating an example of structures of a circuit of a sub-pixel, within which a photo-sensor is disposed, and a sensing circuit in a display device according to embodiments of the present disclosure.

FIG. 4 is a circuit diagram illustrating an example of structures of a circuit of a sub-pixel SP and a sensing circuit 150, which are arranged within a fingerprint sensing area, in the display device 100 according to embodiments of the present disclosure.

As described above, only a sub-pixel SP disposed in the fingerprint sensing area may have such a circuit structure, or alternatively, a particular area may be driven for fingerprint sensing in an embodiment in which all of the sub-pixels SP may have a circuit structure in which a fingerprint can be sensed. Also, the sensing circuit 150 may be divided into the touch sensing circuit 151 and the fingerprint sensing circuit 152, or may be one circuit having two types of functions integrated therein. Hereinafter, for convenience of description, a circuit configured to sense a fingerprint will be described as a sensing circuit 150.

Referring to FIG. 4, a gate line GL intersects a data line DL within the sub-pixel SP disposed in the fingerprint sensing area.

During a fingerprint sensing mode, the gate line GL controls timing at which a voltage is applied and timing at which a signal is detected.

The data line DL may be electrically connected to the sensing circuit 150, and may be used as a line configured to detect a signal during the fingerprint sensing mode.

Within each sub-pixel SP, a switching transistor SWT, a photo-sensor PS, a pixel electrode PXL, and a common electrode CE are arranged. The pixel electrode PXL may be disposed within each sub-pixel SP, and the common electrode CE may be disposed in an area where at least two sub-pixels SP are arranged.

The switching transistor SWT is electrically connected at a first node N1 thereof to the data line DL, is electrically connected at a second node N2 thereof to the gate line GL, and is electrically connected at a third node N3 thereof to the pixel electrode PXL.

The photo-sensor PS is electrically connected between the first and third nodes N1 and N3 of the switching transistor SWT. The photo-sensor PS may be exposed or may not be exposed to light emitted during the fingerprint sensing mode.

The pixel electrode PXL is electrically connected to the third node N3 of the switching transistor SWT, and forms a capacitor C with the common electrode CE.

The sensing circuit 150 may include a switch SW electrically connected to the data line DL, an amplifier, and a feedback capacitor Cfb.

The switch SW of the sensing circuit 150 may be electrically connected at one terminal thereof to the data line DL, and may be electrically connected at the other terminal thereof to an inverting input terminal of the amplifier. Also, the switch SW of the sensing circuit 150 may be turned on during an interval of time for which a signal is detected through the data line DL during the fingerprint sensing mode.

The amplifier may be electrically connected at the inverting input terminal thereof to the switch SW, and may have a non-inverting input terminal to which a reference voltage Vref is applied. Also, the feedback capacitor Cfb may be electrically connected between the inverting input terminal and an output terminal of the amplifier.

When the switch SW of the sensing circuit 150 is turned on, charges are accumulated in the feedback capacitor Cfb according to the state of a voltage of the pixel electrode PXL, and a voltage, which corresponds to the difference between a voltage accumulated in the feedback capacitor Cfb and the reference voltage Vref, or a voltage obtained by inverting the voltage is output through the output terminal of the amplifier.

Accordingly, there occurs the difference between a voltage, which is sensed from a sub-pixel SP within which a photo-sensor PS that is exposed to light is disposed, and a voltage, which is sensed from a sub-pixel SP within which a photo-sensor PS that is not exposed to light is disposed. Then, by using the difference, it is possible to resolve a fingerprint into ridges and valleys and sense the fingerprint.

According a driving scheme, a fingerprint may be sensed while a driving voltage Vdrv is directly applied to the pixel electrode PXL of the fingerprint sensing area. Alternatively, a fingerprint may be sensed without directly applying a driving voltage Vdrv to the pixel electrode PXL of the fingerprint sensing area.

Also, the driving voltage Vdrv may be configured as an Alternating Current (AC) voltage including a plurality of repetitions of a pulse-form voltage, or may be configured as a Direct Current (DC) voltage of a particular level.

Hereinafter, examples of a driving scheme and operation timing of a sub-pixel SP and the sensing circuit 150 during a fingerprint sensing mode will be described in detail, and a fingerprint sensing scheme will be described according to embodiments of the present disclosure.

Figure 5:
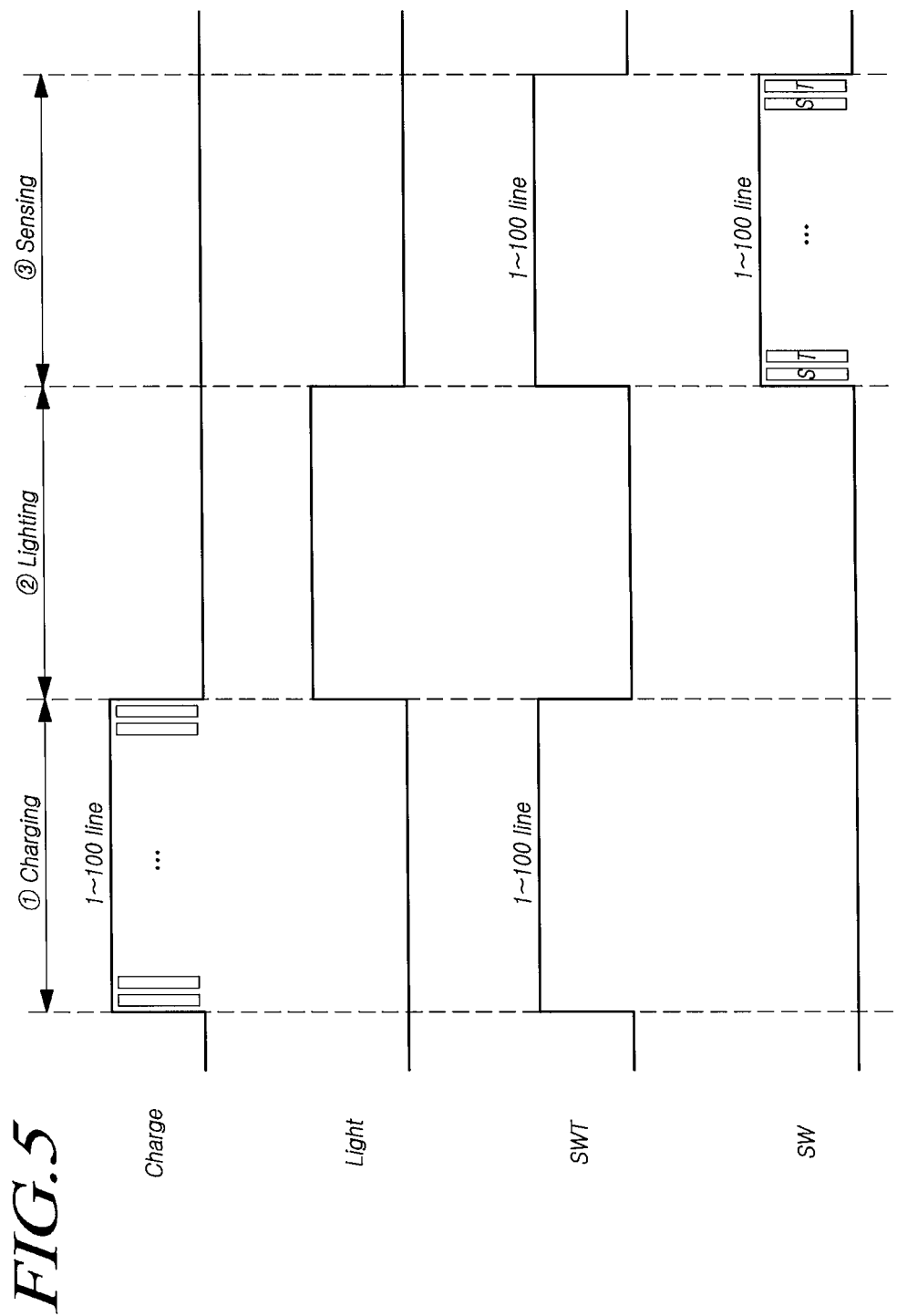
FIG. 5 is a timing diagram illustrating a first embodiment of a scheme in which a display device senses a fingerprint by using a photo-sensor according to embodiments of the present disclosure.

FIG. 5 is a timing diagram illustrating a first embodiment of an operation of the display device 100 for sensing a fingerprint by using a photo-sensor PS and timing of the operation according to embodiments of the present disclosure.

Referring to FIG. 5, in a fingerprint sensing scheme according to the first embodiment, a fingerprint sensing mode may be divided into a charging period (① Charging) for which a driving voltage Vdrv is applied to a pixel electrode PXL of a sub-pixel SP disposed in a fingerprint sensing area, a light irradiation period (② Lighting) for which light is emitted, and a sensing period (③ Sensing) for which a signal is detected through a data line DL.

The fingerprint sensing mode may be a part of a display driving mode or a part of a touch sensing mode. Alternatively, the fingerprint sensing mode may be temporally distinguished from the display driving mode or the touch sensing mode. In an example, the touch sensing mode is temporally distinguished from the fingerprint sensing mode and the display driving mode.

For the charging period in the fingerprint sensing mode, a scan signal for turning on a switching transistor SWT is sequentially applied to gate lines GL of sub-pixels SP arranged in the fingerprint sensing area.

Then, a driving voltage Vdrv for fingerprint sensing may be applied through data lines DL respectively connected to the sub-pixels SP in line with timings at which the switching transistors SWT are turned on.

Alternatively, for the charging period in the fingerprint sensing mode, the gate lines GL of the sub-pixels SP arranged in the fingerprint sensing area may be simultaneously turned on, and driving voltages Vdrv may be simultaneously applied to corresponding pixel electrodes PXL in the fingerprint sensing area. In the present example, the charging period in the fingerprint sensing mode can be shortened.

FIG. 5 illustrates an example in which the number of the sub-pixels SP are 10,000 arranged in the fingerprint sensing area is 100 by 100, wherein a driving voltage Vdrv is applied to the sub-pixels SP arranged in the fingerprint sensing area.

For the charging period, a driving voltage Vdrv is supplied in a state in which the switching transistor SWT is turned on, and thus, the pixel electrode PXL of the sub-pixel SP disposed in the fingerprint sensing area is in a state in which the driving voltage Vdrv is applied to the pixel electrode PXL.

For the light irradiation period in the fingerprint sensing mode, a scan signal for turning off a switching transistor SWT is applied to the gate line GL of the sub-pixel SP disposed in the fingerprint sensing area.

Then, for the light irradiation period, light is emitted by the light source 310.

Light emission timing of the light source 310 may be generated by the controller 140 or the micro-control unit MCU.

For the light irradiation period, a reference voltage Vref may be supplied to the data line DL of the sub-pixel SP disposed in the fingerprint sensing area. The reference voltage Vref may be output from the data driving circuit 130, but the present disclosure is not limited thereto.

Since the driving voltage Vdrv is applied to the pixel electrode PXL, and then the reference voltage Vref is supplied to the data line DL in a state in which the switching transistor SWT is turned off, a voltage difference occurs between the first and third nodes N1 and N3 of the switching transistor SWT.

Then, according to the emission of light, light is blocked from a photo-sensor PS of a sub-pixel SP disposed in an area corresponding to a ridge of a fingerprint, but a photo-sensor PS of a sub-pixel SP disposed in an area corresponding to a valley of the fingerprint is exposed to light.

An electrical characteristic of the photo-sensor PS exposed to light is changed and both terminals of the photo-sensor PS are electrically connected.

That is, the first and third nodes N1 and N3 of the switching transistor SWT are electrically connected to each other, and thus, current flows through the photo-sensor PS.

Also, a level of the driving voltage Vdrv applied to the pixel electrode PXL may become lower according to the amount of a current leaking from the photo-sensor PS.

Accordingly, a difference may occur between a voltage of a pixel electrode PXL of a sub-pixel SP within which a photo-sensor PS that is exposed to light is disposed and a voltage of a pixel electrode PXL of a sub-pixel SP within which a photo-sensor PS that is not exposed to light is disposed.

When the light irradiation period ends, for the sensing period in the fingerprint sensing mode, a scan signal for turning on a switching transistor SWT is applied to the gate line GL of the sub-pixel SP disposed in the fingerprint sensing area.

Then, in the sensing circuit 150, the switch SW connected to the data line DL is turned on.

As the switch SW of the sensing circuit 150 is turned on, a voltage of the pixel electrode PXL may be sensed through the data line DL.

In the present example, by using a voltage of a pixel electrode PXL, from which a leakage current is generated due to light exposure, and a voltage of a pixel electrode PXL, from which a leakage current is not generated due to light blocking, it is possible to resolve a fingerprint into ridges and valleys and sense the fingerprint.

Figure 6:
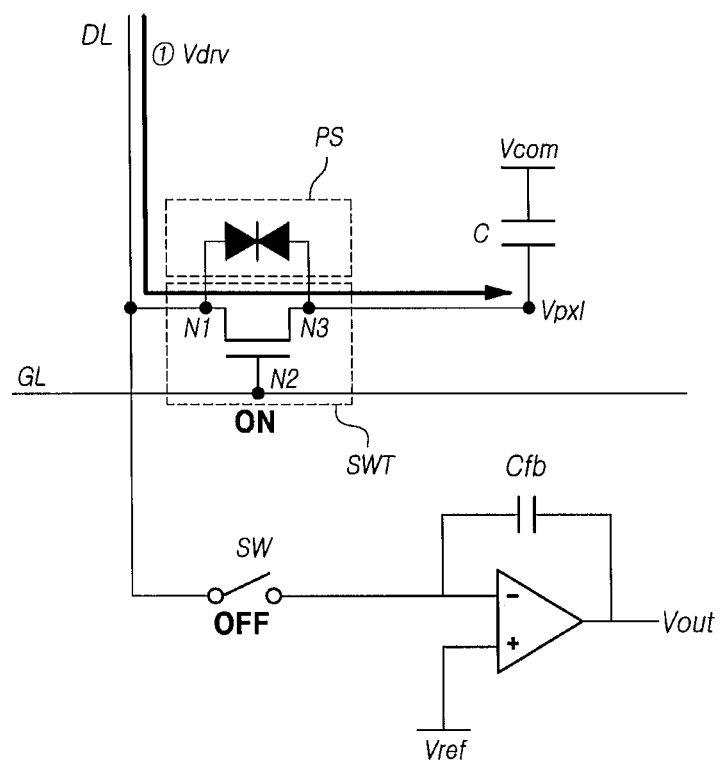
FIGS. 6 to 8 are views for explaining a process of sensing a fingerprint according to the first embodiment.
Figure 7:
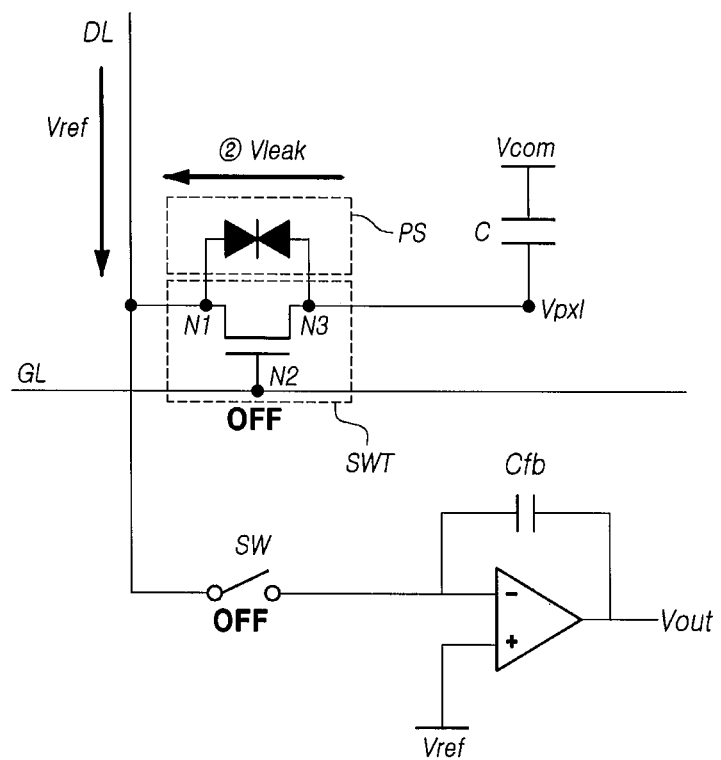
Figure 8:
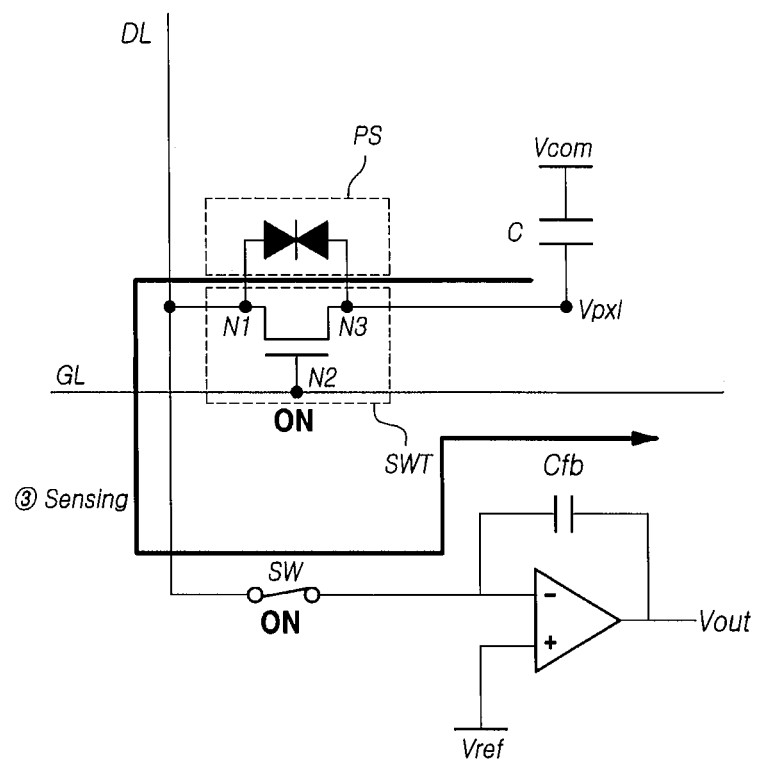

FIGS. 6 to 8 are views specifically illustrating a process of a fingerprint sensing scheme according to the first embodiment.

Referring to FIG. 6, for a charging period in a fingerprint sensing mode, a switching transistor SWT of a sub-pixel SP disposed in a fingerprint sensing area is turned on, and a driving voltage Vdrv is applied through a data line DL.

The driving voltage Vdrv for fingerprint sensing may be supplied from the data driving circuit 130.

Alternatively, the sensing circuit 150 and a circuit, which is configured to supply data lines DL with a driving voltage Vdrv, a reference voltage Vref, or the like that is required for fingerprint sensing, may constitute one driving circuit. Alternatively, a circuit coupled to the Vpxl node by a switch that is on the node N3, such as a switch adjacent to the gate of the drive transistor DT can also provide the driving voltage Vdrv to charge the first electrode Vpxl.

As the driving voltage Vdrv is applied for the charging period, a pixel electrode PXL of the sub-pixel SP disposed in the fingerprint sensing area is in a state in which the driving voltage Vdrv is applied to the pixel electrode PXL. This charges the capacitor C.

Referring to FIG. 7, for a light irradiation period in the fingerprint sensing mode, the switching transistor SWT disposed in the fingerprint sensing area is turned off, and light is emitted by the light source 310.

Then, for the light irradiation period, the reference voltage Vref is supplied through the data line DL disposed in the fingerprint sensing area.

The photo-sensor PS disposed within the sub-pixel SP of the fingerprint sensing area is exposed or is not exposed to light according to whether the photo-sensor PS is positioned to correspond to a ridge or valley of a fingerprint.

An electrical characteristic of the photo-sensor PS disposed at a position corresponding to the ridge, that is, in a light blocking area, is not changed, and thus, a leakage current is not generated through the photo-sensor PS.

In contrast, an electrical characteristic of the photo-sensor PS disposed at a position corresponding to the valley, that is, in a light exposure area, is changed, and thus, a leakage current is generated through the photo-sensor PS. As can be seen in FIG. 3, light is emitted by the light guide plate 320 at the location of the valley due to the reflection at the upper surface, but no light is emitted from the location of a ridge.

Referring to FIG. 8, for a sensing period in the fingerprint sensing mode, the switching transistor SWT disposed in the fingerprint sensing area is turned on.

Then, in the sensing circuit 150, the switch SW connected to the data line DL is turned on.

The switching transistor SWT and the switch SW of the sensing circuit 150, which are disposed within the sub-pixel SP of the fingerprint sensing area, are turned on, and thus, a voltage of the pixel electrode PXL disposed within the sub-pixel SP of the fingerprint sensing area may be sensed through the data line DL.

The voltage of the pixel electrode PXL sensed for the sensing period may be different according to whether the photo-sensor PS is exposed to light.

Figure 9:
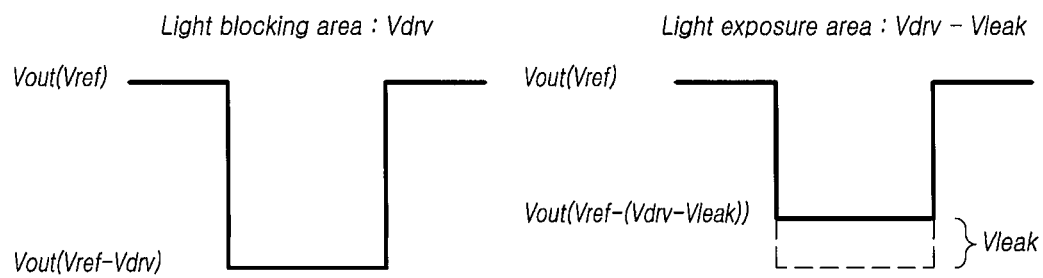
FIG. 9 is a view illustrating an example of a signal detected during a fingerprint sensing mode when a fingerprint is sensed according to the first embodiment.

FIG. 9 is a view illustrating an example of an output signal according to a voltage of a pixel electrode PXL detected using the fingerprint sensing scheme according to the first embodiment.

Referring to FIG. 9, a voltage of the pixel electrode PXL disposed within the sub-pixel SP corresponding to the light blocking area may be a driving voltage Vdrv.

The voltage of the pixel electrode PXL may be accumulated in the feedback capacitor Cfb of the sensing circuit 150, and a voltage Vout corresponding to the difference between the voltage accumulated in the feedback capacitor Cfb and the reference voltage Vref may be output from the output terminal of the amplifier.

As an example, the amplifier of the sensing circuit 150 is described as a negative amplifier, and outputs a signal corresponding to a voltage, the level of which is reduced from the reference voltage Vref by the driving voltage Vdrv applied to the pixel electrode PXL.

That is, before the voltage of the pixel electrode PXL is sensed, the amplifier outputs the reference voltage Vref (Vout(Vref)), and outputs a signal corresponding to a voltage (Vout(Vref−Vdrv)) which is lower by the driving voltage Vdrv than the reference voltage Vref according to sensing of the voltage of the pixel electrode PXL.

In contrast, a voltage of the pixel electrode PXL disposed within the sub-pixel SP corresponding to the light exposure area may be reduced by a leakage voltage Vleak corresponding to a leakage current.

Accordingly, the voltage of the pixel electrode PXL becomes lower by the leakage voltage Vleak than the driving voltage Vdrv.

Since a voltage corresponding to (Vdrv−Vleak) is accumulated in the feedback capacitor Cfb of the sensing circuit 150, the amplifier outputs a signal corresponding to a voltage difference between the reference voltage Vref and the voltage (Vdrv−Vleak) accumulated in the feedback capacitor Cfb.

Accordingly, a difference corresponding to the amount of the leakage voltage Vleak occurs between a voltage sensed from the pixel electrode PXL of the sub-pixel SP corresponding to the light blocking area and a voltage sensed from the pixel electrode PXL of the sub-pixel SP corresponding to the light exposure area.

By using the voltage difference sensed from the light blocking area and the light exposure area, it is possible to detect ridges and valleys of the fingerprint, which touch the respective corresponding sub-pixels SP, and sense the fingerprint.

Therefore, according to embodiments of the present disclosure, a fingerprint may be sensed using a photo-sensor disposed within a sub-pixel SP of a fingerprint sensing area, so as to sense a fingerprint in an active area A/A of the display panel 110.

Also, a fingerprint may be sensed in a structure in which a photo-sensor PS is connected to a switching transistor SWT that is essentially included in a sub-pixel SP, so as to sense a fingerprint at all positions of the active area A/A.

The above-described fingerprint sensing scheme is operated in such a manner that a fingerprint sensing mode is divided into a period for which a driving voltage Vdrv is applied to a pixel electrode PXL, a light irradiation period, and a sensing period, and thus the entire fingerprint sensing mode becomes longer since it has a number of distinct time periods. Accordingly, the above-described fingerprint sensing scheme has some disadvantages in that a display driving mode or a touch sensing mode are affected.

Also, the above-described fingerprint sensing scheme has some disadvantages in that: the capacity of the feedback capacitor Cfb of the sensing circuit 150 is designed with reference to the driving voltage Vdrv applied to the pixel electrode PXL, and thus, the capacity of the feedback capacitor Cfb is increased; and the level of a leakage voltage Vleak is lower than that of the driving voltage Vdrv, and thus, sensing sensitivity may not be high.

The display device 100 according to embodiments of the present disclosure is designed to provide a method which, by using a scheme for sensing a fingerprint without directly applying a driving voltage Vdrv to a pixel electrode PXL, can shorten a fingerprint sensing mode and can improve the sensitivity of fingerprint sensing.

Figure 10:
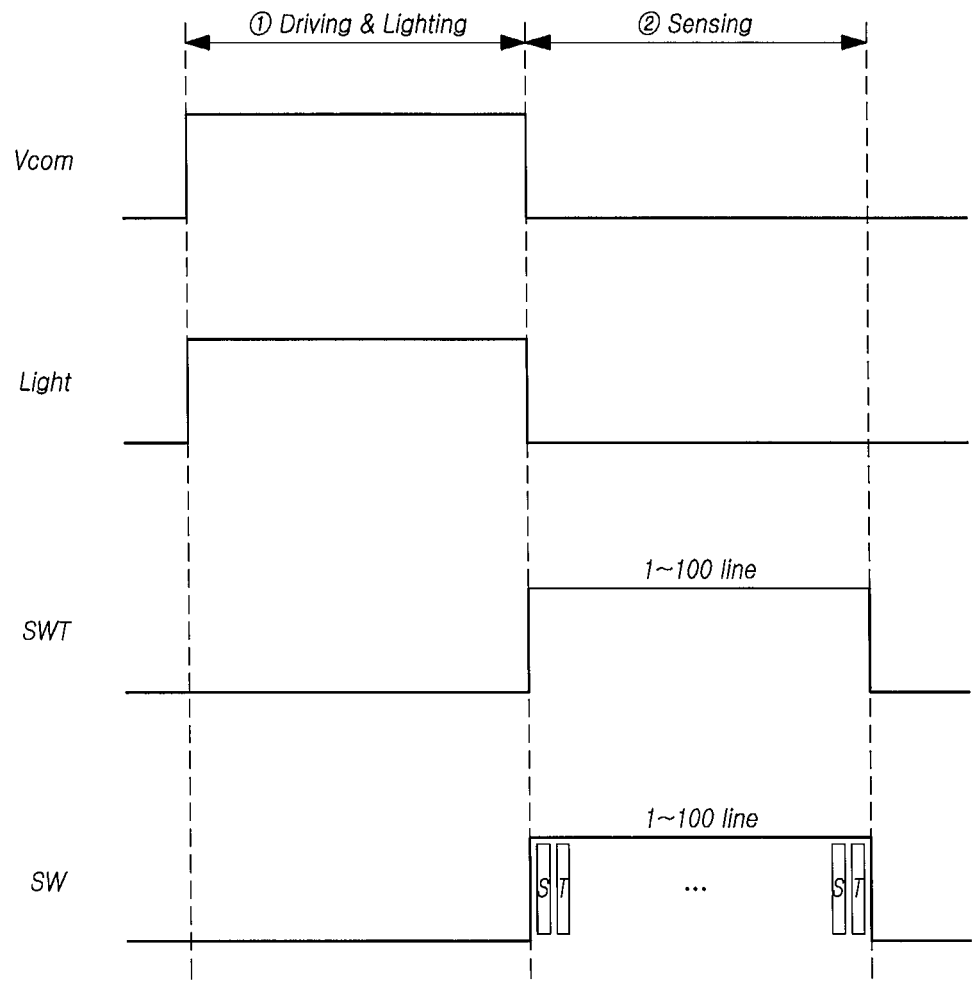
FIG. 10 is a timing diagram illustrating a second embodiment of a scheme in which a display device senses a fingerprint by using a photo-sensor according to embodiments of the present disclosure.

FIG. 10 is a timing diagram illustrating a second embodiment of operations of a scheme for sensing a fingerprint by the display device 100 and timings of the operations according to embodiments of the present disclosure.

Referring to FIG. 10, in the fingerprint sensing scheme according to the second embodiment, a fingerprint sensing mode may be divided into a driving period (① Driving & Lighting) for which a pixel electrode PXL of a sub-pixel SP disposed in a fingerprint sensing area is driven and light is emitted, and a sensing period (② Sensing) for which a signal is detected through a data line DL.

Hereinafter, the driving period may also be referred to as a "first period," and the sensing period may also be referred to as a "second period."

For the driving period in the fingerprint sensing mode, a scan signal for turning off a switching transistor SWT is applied to a gate line GL disposed within a sub-pixel SP of the fingerprint sensing area.

Accordingly, during the fingerprint sensing mode, the number of times a turn-on scan signal is applied to the gate line GL disposed within the sub-pixel SP of the fingerprint sensing area may be reduced.

Also, for the driving period, a driving voltage Vdrv is applied to common electrodes CE arranged within sub-pixels SP of the fingerprint sensing area. Further, the driving voltage Vdrv may be applied not only to the common electrodes CE corresponding to the fingerprint sensing area, but also may be applied to all of the common electrodes CE corresponding to the entire area of the display panel 110.

In the present example, the driving voltage Vdrv applied to the common electrode CE may have a level which is identical to or slightly higher than that of a driving voltage Vdrv applied to a pixel electrode PXL in the first embodiment.

Since a common electrode CE is disposed in an area including at least two sub-pixels SP, the number of times of application of a driving voltage Vdrv needs to be applied is reduced from a scheme for applying a driving voltage Vdrv to a pixel electrode PXL. Also, since the common electrode CE is used as an electrode for fingerprint sensing, a fingerprint may also be sensed by utilizing the touch sensing circuit 151 configured to output a touch driving signal to a common electrode CE during touch sensing.

Since such a common electrode CE forms a capacitor C with a pixel electrode PXL, as a driving voltage Vdrv is applied to the common electrode CE, the level of a voltage of the pixel electrode PXL in its high-impedance state may become higher for the driving period than for a period before the driving period.

The level of a voltage of the pixel electrode PXL may be identical to or slightly lower than that of the driving voltage Vdrv applied to the common electrode CE.

For the driving period in the fingerprint sensing mode, a reference voltage Vref is supplied to a data line DL disposed within the sub-pixel SP of the fingerprint sensing area, and light is emitted by the light source 310.

In this embodiment, the driving voltage Vdrv is not directly applied to the pixel electrode PXL but instead may be applied only to the common electrode CE so as to drive the pixel electrode PXL, thereby supplying the reference voltage Vref to the data line DL.

Accordingly, in the state in which: the level of a voltage of the pixel electrode PXL becomes higher than for a period before the driving period; the reference voltage Vref is applied to the data line DL; and the switching transistor SWT is turned off, a leakage current may be generated through the photo-sensor PS by irradiating, with light, the photo-sensor PS.

That is, the pixel electrode PXL may be driven by applying the driving voltage Vdrv to the common electrode CE, and thus, the driving of the pixel electrode PXL and light irradiation may be performed for the same period.

The driving of the pixel electrode PXL and light irradiation may be performed for the same period, making it possible to shorten a length of the fingerprint sensing mode and sense a fingerprint.

When the driving period in the fingerprint sensing mode ends, the supply of the driving voltage Vdrv to the common electrode CE is stopped.

Since the driving voltage Vdrv is not applied to the common electrode CE after the driving period in the fingerprint sensing mode ends, the voltage of the pixel electrode PXL becomes lower again than for the driving period.

In the present example, when a leakage current is generated due to light exposure for the driving period in the fingerprint sensing mode, a level of the voltage of the pixel electrode PXL may become lower than a level before the driving period.

As an example, when the level of the voltage of each pixel electrode PXL before the driving period in the fingerprint sensing mode is the reference voltage Vref, a voltage of a pixel electrode PXL of a sub-pixel SP disposed in a light blocking area may be the reference voltage Vref, and a voltage of a pixel electrode PXL of a sub-pixel SP disposed in a light exposure area may be lower than the reference voltage Vref.

Accordingly, a fingerprint may be sensed by using such a voltage difference.

For a sensing period in the fingerprint sensing mode, a scan signal for turning on a switching transistor SWT is applied to the gate line GL disposed within the sub-pixel SP of the fingerprint sensing area. In the present example, during the sensing period in the fingerprint sensing mode, the reference voltage Vref may be applied to the common electrode CE. Also, the reference voltage Vref applied to the common electrode CE for the sensing period as well as the driving voltage Vdrv applied to the common electrode CE for the driving period may be output from a same output unit.

Then, in the sensing circuit 150, a switch SW connected to a data line DL is turned on.

For the sensing period in the fingerprint sensing mode, the reference voltage Vref is not applied to the data line DL disposed within the sub-pixel SP of the fingerprint sensing area, and thus, the sensing circuit 150 may sense a voltage of the pixel electrode PXL through the data line DL.

Figure 11:
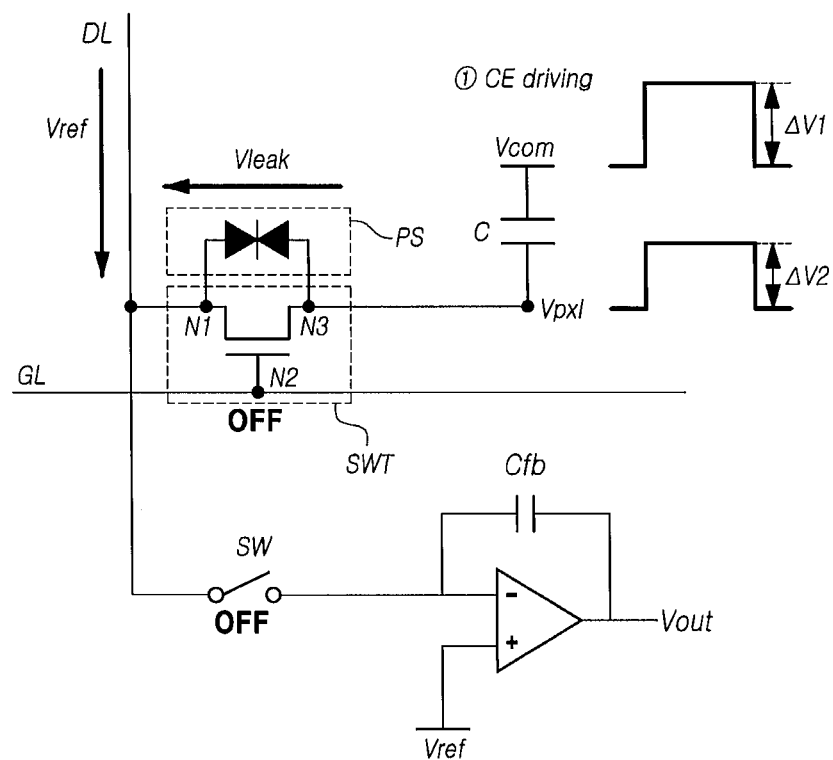
FIGS. 11 and 12 are views for explaining a process of sensing a fingerprint according to the second embodiment.
Figure 12:
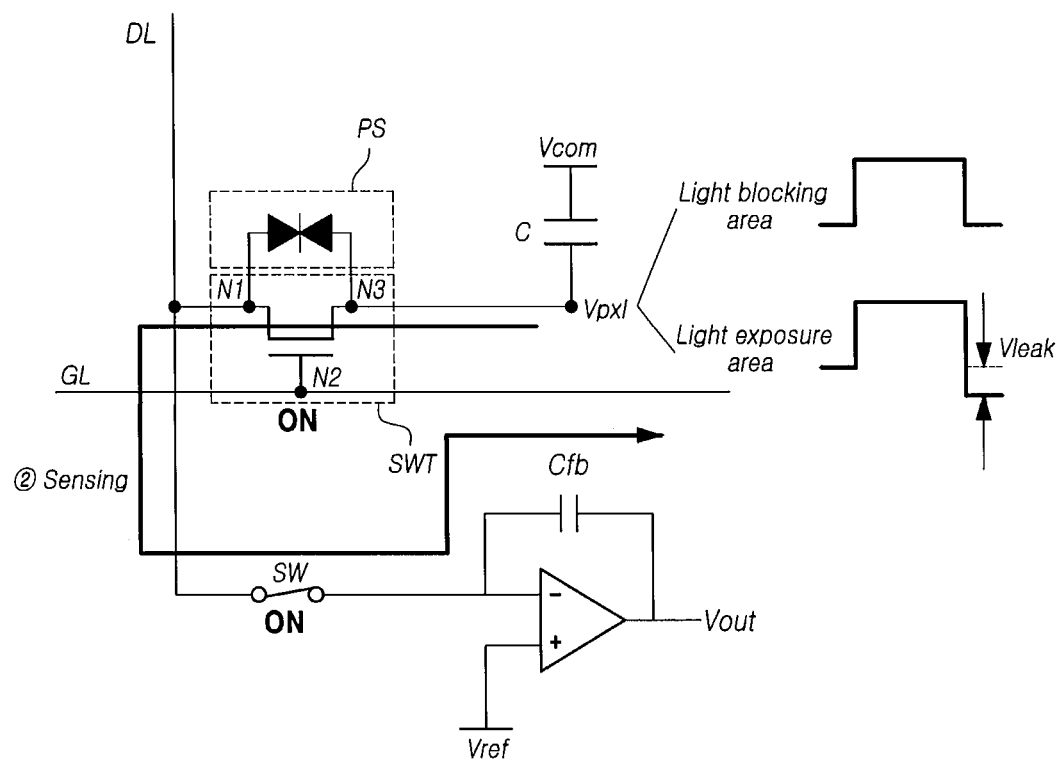

FIGS. 11 and 12 are views specifically illustrating a process of a fingerprint sensing scheme according to the second embodiment.

Referring to FIG. 11, for a first period in a fingerprint sensing mode, a switching transistor SWT disposed within a sub-pixel SP in a fingerprint sensing area is turned off.

Then, a driving voltage Vdrv is supplied to a common electrode CE disposed within the sub-pixel SP in the fingerprint sensing area.

The driving voltage Vdrv supplied to the common electrode CE may be output from the sensing circuit 150. That is, by using the touch sensing circuit 151 configured to output a driving signal for touch sensing to a common electrode CE, the driving voltage Vdrv may be supplied. Alternatively, the driving voltage Vdrv may be supplied from a separate driving circuit.

For the first period in the fingerprint sensing mode, the driving voltage Vdrv is applied to the common electrode CE, and thus, the level of a voltage of a pixel electrode PXL, which forms a capacitor C with the common electrode CE and is in its high-impedance state, may be coupled to a voltage of the common electrode CE and may become higher.

As an example, when the level of a voltage of the common electrode CE is heightened by ΔV1 by the driving voltage Vdrv applied to the common electrode CE, the level of a voltage of the pixel electrode PXL may be heightened by ΔV2.

In the present example, ΔV2 may be almost identical to ΔV1, and may be slightly lower than ΔV1.

Alternatively, ΔV2 may be controlled by adjusting a level of the driving voltage Vdrv applied to the common electrode CE so that the level of a voltage of the pixel electrode PXL can be the level of a voltage for fingerprint sensing.

For the first period in the fingerprint sensing mode for which the level of a voltage of the pixel electrode PXL becomes ΔV2, a reference voltage Vref is supplied to a data line DL disposed within the sub-pixel SP of the fingerprint sensing area.

Then, light is emitted by the light source 310.

In the state in which: the level of a voltage of the pixel electrode PXL disposed within the sub-pixel SP of the fingerprint sensing area becomes higher than for a period before the driving period; the reference voltage Vref is applied to the data line DL; and the switching transistor SWT is turned off, light is emitted, and thus, a leakage current may be generated through a photo-sensor PS according to a light blocking area or a light exposure area.

Accordingly, by using a scheme for applying a driving voltage Vdrv to only a common electrode CE without directly applying the driving voltage Vdrv to the pixel electrode PXL disposed within the sub-pixel SP of the fingerprint sensing area, a voltage difference may occur between pixel electrodes PXL according to the light blocking area and the light exposure area, and a ridge and a valley of a fingerprint may be sensed.

Referring to FIG. 12, for a second period in the fingerprint sensing mode, the switching transistor SWT disposed within the sub-pixel SP in the fingerprint sensing area is turned on and a switch SW of the sensing circuit 150 is turned on.

For the second period in the fingerprint sensing mode, the driving voltage Vdrv is not applied to the common electrode CE, and thus, a voltage of the common electrode CE becomes lower. Accordingly, a voltage of the pixel electrode PXL also becomes lower.

In the present example, a voltage of a pixel electrode PXL disposed within a sub-pixel SP positioned in the light exposure area becomes lower than that of a pixel electrode PXL disposed within a sub-pixel SP positioned in the light blocking area.

As an example, as illustrated in FIG. 12, the level of a voltage of the pixel electrode PXL of the sub-pixel SP positioned in the light blocking area becomes lower identically to the level of a voltage of the common electrode CE before being driven.

In contrast, the level of a voltage of the pixel electrode PXL of the sub-pixel SP positioned in the light exposure area becomes lower by a leakage voltage Vleak than the level of the voltage of the common electrode CE before being driven.

Since a voltage of the pixel electrode PXL of the sub-pixel SP positioned in the light exposure area is lower than the reference voltage Vref while the switch SW of the sensing circuit 150 is turned on, the amount of charges of a feedback capacitor Cfb may be reduced by the leakage voltage Vleak.

That is, the sensing circuit 150 senses a voltage, which becomes lower than the reference voltage Vref, from the pixel electrode PXL of the sub-pixel SP positioned in the light exposure area.

FIG. 13 is a view illustrating an example of an output signal depending on a voltage of a pixel electrode PXL detected using the fingerprint sensing scheme according to the second embodiment.

Referring to FIG. 13, the level of a voltage of a pixel electrode PXL of a sub-pixel SP disposed in a light blocking area may become a reference voltage Vref according to termination of the application of a driving voltage Vdrv to a common electrode CE.

Accordingly, since charges corresponding to the reference voltage Vref are accumulated in the feedback capacitor Cfb and the reference voltage Vref is applied to a non-inverting input terminal of an amplifier of the sensing circuit 150, the amplifier thereof may provide an output signal (Vout(Vref−Vref)) which is not changed as compared with before execution of sensing.

A voltage of a pixel electrode PXL of a sub-pixel SP disposed in a light exposure area may have a level which is lower than that of the reference voltage Vref according to a leakage voltage Vleak.

In the feedback capacitor Cfb of the sensing circuit 150, a voltage, which becomes lower by a leakage voltage Vleak than the reference voltage Vref, is accumulated and thus the amplifier may provide an output signal (Vout(Vref−(Vref−Vleak))) corresponding to the difference between the reference voltage Vref and (Vref−Vleak).

Therefore, it is possible to resolve a fingerprint into ridges and valleys and sense the fingerprint by using the voltage difference between pixel electrodes PXL sensed in the light blocking area and the light exposure area.

Also, the difference between the reference voltage Vref and the leakage voltage Vleak has only to be sensed without directly applying the driving voltage Vdrv to the pixel electrode PXL, making it possible to reduce the capacity of the feedback capacitor C of the sensing circuit 150.

Also, sensing is performed using the difference between the reference voltage Vref and the leakage voltage Vleak, so that sensing sensitivity can be further improved.

Figure 14:
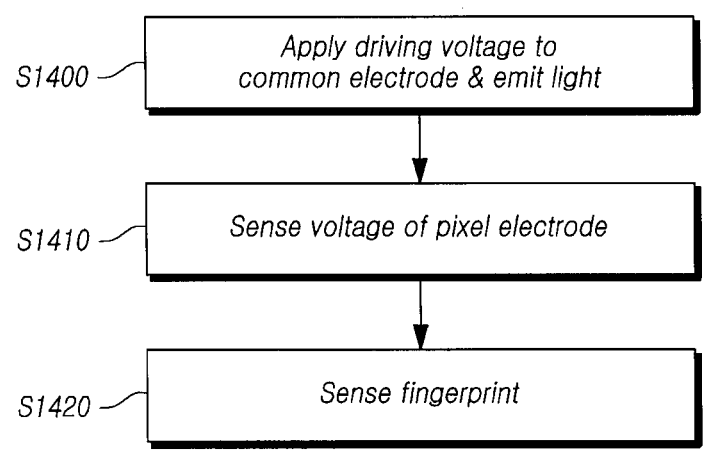
FIG. 14 is a flowchart illustrating a driving method of a driving circuit according to embodiments of the present disclosure.

FIG. 14 is a flowchart illustrating a driving method of a driving circuit according to embodiments of the present disclosure.

In the present example, the driving circuit may signify a circuit including the fingerprint sensing circuit 152, or the touch sensing circuit 151 and the fingerprint sensing circuit 152. Alternatively, the driving circuit may signify a circuit including both a circuit, which is configured to provide a driving voltage Vdrv and a reference voltage Vref during a fingerprint sensing mode, and the sensing circuit 150.

Referring to FIG. 14, in operation S1400, for a first period in the fingerprint sensing mode, the driving circuit supplies a driving voltage Vdrv to a common electrode CE disposed within a sub-pixel SP of a fingerprint sensing area.

Then, the driving circuit may supply the reference voltage Vref to a data line DL disposed within the sub-pixel SP of the fingerprint sensing area.

For the first period in the fingerprint sensing mode, light is emitted by the light source 310, and a leakage current is generated through a photo-sensor PS disposed within a sub-pixel SP positioned in a light exposure area.

For a second period in the fingerprint sensing mode, the driving circuit stops the supply of the driving voltage Vdrv to the common electrode CE disposed within the sub-pixel SP of the fingerprint sensing area. Then, the driving circuit may supply the reference voltage Vref to the common electrode CE.

Also, the driving circuit stops the supply of the reference voltage Vref to the data line DL.

In operation S1410, the driving circuit senses a voltage of the pixel electrode PXL through the data line DL disposed within the sub-pixel SP of the fingerprint sensing area.

In operation S1420, voltages of the pixel electrodes PXL are differently sensed according to light blocking and light exposure, and thus, the driving circuit resolves a fingerprint into ridges and valleys and senses the fingerprint by using the sensed voltage of the pixel electrode PXL.

According to embodiments of the present disclosure, a photo-sensor PS is disposed to be connected between a source node and a drain node of a switching transistor SWT disposed within a sub-pixel SP, and a fingerprint is sensed using a change in a voltage of a pixel electrode PXL according to a leakage current generated through the photo-sensor PS, making it possible to sense a fingerprint in an active area A/A of the display panel 110.

Also, a fingerprint is sensed by driving a common electrode CE without directly applying a driving voltage Vdrv to the pixel electrode PXL, so as to perform driving of the pixel electrode PXL and light irradiation together, thereby enabling a reduction in a fingerprint sensing mode.

Further, sensing is performed by using the level of a leakage voltage Vleak of the pixel electrode PXL rather than a change width of the driving voltage Vdrv applied to the pixel electrode PXL, making it possible to minimize the capacity of a feedback capacitor Cfb of the sensing circuit 150 and improve sensing sensitivity.

The above description is merely provided as an example of the technical idea of the present disclosure, and those having ordinary knowledge in the technical field to which the present disclosure pertains will appreciate that various modifications and changes in form may be made to the embodiments described herein without departing from the essential features of the present disclosure. Also, the embodiments disclosed in the present disclosure are intended not to limit but to describe the technical idea of the present disclosure, and thus do not limit the scope of the technical idea of the present disclosure. The scope of the present disclosure should be construed based on the appended claims, and all of the technical ideas included within the scope equivalent to the appended claims should be construed as being included within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:
a gate line;
a data line;
a sub-pixel which is adjacent to the overlap location between the gate line and the data line;
a capacitor within the sub-pixel, the capacitor having a first electrode and a second electrode;
a transistor having a first node disposed within the sub-pixel and electrically connected to the data line, a second node electrically connected to the gate line, and a third node electrically connected to the first electrode;
a photo-sensor electrically connected between the first node and the third node of the transistor, wherein the transistor does not have photo-sensing features as the photo-sensor;
a light source configured to emit light;
a driving circuit configured to, for a first period in a fingerprint sensing mode, output a driving voltage to the second electrode of the capacitor and output a reference voltage to the data line; and
a sensing circuit configured to, for a second period in the fingerprint sensing mode, sense a voltage of the first electrode through the data line,
wherein the driving circuit is configured to:
output the data voltage to the data line during a display driving mode which is temporally distinguished from the fingerprint sensing mode, and
output a touch driving signal to the second electrode during a touch sensing mode which is temporally distinguished from the fingerprint sensing mode.

2. The display device of claim 1, wherein the driving circuit is configured to,
for the second period in the fingerprint sensing mode, output the reference voltage to the second electrode.

3. The display device of claim 1, wherein the driving circuit is configured to,
for the second period in the fingerprint sensing mode, stop outputting the reference voltage to the data line.

4. The display device of claim 1, wherein the sensing circuit is configured to,
for the second period in the fingerprint sensing mode, sense a voltage which corresponds to or is lower than the reference voltage.

5. The display device of claim 1, wherein the first electrode has a voltage which becomes higher for the first period in the fingerprint sensing mode than a period before the first period, and becomes lower for the second period in the fingerprint sensing mode than for the first period.

6. The display device of claim 1, wherein:
the transistor is configured to:
be turned off for the first period in the fingerprint sensing mode, and
be turned on for the second period in the fingerprint sensing mode; and
the light source is configured to emit light for the first period in the fingerprint sensing mode.

7. The display device of claim 1, wherein the second electrode is disposed in an area comprising at least two sub-pixels and is common to the two sub-pixels.

8. A driving circuit comprising:
a driving voltage output unit configured to:
for a first period in a fingerprint sensing mode, output a driving voltage to a capacitor, the capacitor having a first electrode and a second electrode;
a reference voltage output unit configured to:
output a reference voltage to a data line; and
a sensing circuit configured to, for a second period in the fingerprint sensing mode, sense a voltage of the first electrode.

9. The driving circuit of claim 8 wherein the reference voltage is output during the first period.

10. The driving circuit of claim 8 wherein the reference voltage is output during a third period between the first and second periods.

11. The driving circuit of claim 8 wherein the driving voltage is output to the first electrode.

12. The driving circuit of claim 8 wherein the driving voltage is output to the second electrode.

13. The driving circuit of claim 8, wherein the driving voltage output unit is configured to:
for the second period in the fingerprint sensing mode, output the reference voltage to the common electrode.

14. The driving circuit of claim 8, wherein the sensing circuit comprises:
a switch connected at one terminal thereof to each of the data lines;
an amplifier connected at an inverting input terminal thereof to another terminal of the switch, and configured to receive the reference voltage applied to a non-inverting input terminal thereof; and
a feedback capacitor connected between the inverting input terminal and an output terminal of the amplifier.

15. The driving circuit of claim 14, wherein the transistor and the switch are configured to:
be turned off for the first period in the fingerprint sensing mode, and
be turned on for the second period in the fingerprint sensing mode.

16. The driving circuit of claim 8, wherein the sensing circuit is configured to:
for the second period in the fingerprint sensing mode, sense a voltage which corresponds to or is lower than the reference voltage.

17. A driving method of a driving circuit, the driving method comprising:
- outputting a driving voltage to a common electrode disposed in a fingerprint sensing area for a first period in a fingerprint sensing mode;
- outputting a reference voltage to a data line for the first period in the fingerprint sensing mode, wherein the data line is connected to a pixel electrode, disposed in the fingerprint sensing area, through a transistor, wherein the driving voltage to the common electrode is different from the reference voltage to the data line; and
- sensing a voltage of the pixel electrode for a second period after the first period in the fingerprint sensing mode,
- wherein a data voltage is output to the data line during a display driving mode which is temporally distinguished from the fingerprint sensing mode, and
- a touch driving signal is output to the common electrode during a touch sensing mode which is temporally distinguished from the fingerprint sensing mode.

18. The driving method of claim 17, further comprising
- outputting the reference voltage to the common electrode for the second period in the fingerprint sensing mode.

19. The driving method of claim 17, further comprising
- stopping the outputting of the reference voltage to the data line for the second period in the fingerprint sensing mode.

* * * * *